US012261345B2

(12) United States Patent
Mehmood et al.

(10) Patent No.: US 12,261,345 B2
(45) Date of Patent: Mar. 25, 2025

(54) RADIO FREQUENCY DEVICE PROVIDING A TRANSITION UNIT FOR COUPLING A HOLLOW WAVEGUIDE TO A DIFFERENTIAL PAIR TRANSMISSION LINE HAVING OVERLAPPING OPEN LOOPS

(71) Applicant: BEIJING BOE SENSOR TECHNOLOGY CO., LTD., Beijing (CN)

(72) Inventors: Arshad Mehmood, Darmstadt (DE); Alexander Gäbler, Darmstadt (DE)

(73) Assignee: BEIJING BOE SENSOR TECHNOLOGY CO., LTD., Beijing (CN)

( * ) Notice: Subject to any disclaimer, the term of this patent is extended or adjusted under 35 U.S.C. 154(b) by 296 days.

(21) Appl. No.: 17/812,188

(22) Filed: Jul. 13, 2022

(65) Prior Publication Data

US 2023/0015885 A1 Jan. 19, 2023

(30) Foreign Application Priority Data

Jul. 15, 2021 (EP) .................................... 21185885

(51) Int. Cl.
*H01P 5/107* (2006.01)
*H01P 3/08* (2006.01)

(52) U.S. Cl.
CPC ................ *H01P 5/107* (2013.01); *H01P 3/08* (2013.01)

(58) Field of Classification Search
CPC ............................... H01P 5/107; H01P 5/1022
(Continued)

(56) References Cited

U.S. PATENT DOCUMENTS 8,441,405 B2 * 5/2013 Tsutsumi et al. ....... H01P 5/107 343/771
2010/0225410 A1 * 9/2010 Margomenos et al. ...................... H01P 5/107 333/26

(Continued)

FOREIGN PATENT DOCUMENTS

CN 108879056 A 11/2018
EP 3796466 A1 3/2021

OTHER PUBLICATIONS

Methfessel, Sebastian, and Lorenz-Peter Schmidt. "Design of a balanced-fed patch-excited horn antenna at millimeter-wave frequencies." In Proceedings of the Fourth European Conference on Antennas and Propagation, pp. 1-4. IEEE, 2010.

(Continued)

*Primary Examiner* — Benny T Lee
(74) *Attorney, Agent, or Firm* — Dilworth & Barrese, LLP; Michael J. Musella, Esq.

(57) ABSTRACT

A transition unit of a radio frequency device provides a transition between a planar differential pair transmission line and a hollow radio frequency waveguide. It comprises a substrate layer arrangement with a planar differential pair transmission line arranged on one or more surfaces of at least one substrate layer, whereby an end section of the differential pair transmission line is configured as a radio frequency signal transition pattern. It further comprises an end section of a waveguide that is attached to the substrate layer arrangement and that superposes the radio frequency signal transition pattern. The waveguide is directed perpendicular to the substrate layer arrangement. An open end of the end section of the waveguide is attached to a first outer surface or a second outer surface of the substrate layer arrangement. The transition pattern comprises open loop
(Continued)

shaped end sections of a first and second transmission line segment.

9 Claims, 4 Drawing Sheets

(58) Field of Classification Search
USPC .......................................................... 333/26
See application file for complete search history.

(56) References Cited

U.S. PATENT DOCUMENTS

2015/0364830 A1 12/2015 Tong et al.
2016/0141740 A1* 5/2016 Natsuhara et al. ....... H01P 5/12 333/239

OTHER PUBLICATIONS

Miah, Md Suzan, Mikko Heino, Clemens Icheln, and Katsuyuki Haneda. "Design of a Reference Dipole-Loop Antenna Array at 28 GHz." In 2019 13th European Conference on Antennas and Propagation (EuCAP), pp. 1-5. IEEE, 2019.

* cited by examiner

RADIO FREQUENCY DEVICE PROVIDING A TRANSITION UNIT FOR COUPLING A HOLLOW WAVEGUIDE TO A DIFFERENTIAL PAIR TRANSMISSION LINE HAVING OVERLAPPING OPEN LOOPS

CROSS-REFERENCE TO RELATED APPLICATION

This application claims the benefit of European Patent Application No. 21 185 885.7, filed 2021 Jul. 15, the contents of which is hereby incorporated by reference in its entirety.

TECHNICAL FIELD

The disclosure relates to a radio frequency device with a transition unit providing a transition between a planar differential pair transmission line and a hollow radio frequency waveguide

BACKGROUND

Several applications for electromagnetic waves and corresponding signals require low loss transmission or low loss distribution of radio frequency signals, or both. Hollow waveguides, as e.g. a rectangular waveguide, feature this behavior and are commonly used in this regard. However, further signal processing usually requires a transition to a planar substrate where, depending on the purpose, several kinds of planar transmission lines are commonly used. The coupling of radio frequency waves between hollow waveguides and planar transmission lines depends on the kind of planar transmission line that is used for signal transmission along a planar substrate layer. Different kinds of planar transmission lines include e.g. a microstrip transmission line or a differential pair transmission line. Nevertheless, the majority of published work focuses to the radio frequency signal transition from a hollow waveguide into the microstrip mode.

A planar differential pair transmission line can be arranged on two opposing surfaces of a single substrate layer. In this case, the substrate layer arrangement comprises at least the single substrate layer, but may also comprise additional substrate layers dedicated to other means or functions. It is also possible to arrange different sections of a planar differential pair transmission line at surfaces of two or even more different substrate layers of a substrate layer arrangement that comprises these two or more different substrate layers. In recent developments a planar differential pair transmission line is arranged on two surfaces of two substrate layers made of e.g. glass, whereby the two substrate layers are arranged towards each other at a distance. Sections of the planar differential pair transmission line are arranged at the two surfaces of the two substrate layers that face each other. In case that a material with variable and controllable dielectric characteristics is arranged inside between the two substrate layers, the signal transmission characteristics of the planar differential pair transmission line can be modified.

Several possibilities of transitions from hollow waveguide into the differential strip line mode are also known from literature, but such transitions are affected by detrimental characteristics and constraints. Usually, such transitions suffer from bandwidth limitations. In many cases the already known transitions require vias within the substrate layer arrangement which are not only costly but also not easily applicable to all substrate technologies used, e.g. multilayer glass. These transitions are also comparable bulky, which limits the application to either one single transition or multiple transitions which are geometrically well separated. Furthermore, such transitions usually require the insertion of at least one substrate layer of the substrate layer arrangement into the waveguide itself which limits the placement of the transition to edge or corner points of the substrate.

However, for many applications more tightly spaced transition points are required without the limitation to substrate edges and without the need of radiation suppressing vias over a larger bandwidth. WO 2021/053153 discloses a radio frequency device with a transition between a planar differential pair transmission line and a hollow radio frequency waveguide that does not require radiation suppressing vias and provides for a good coupling of the electromagnetic waves transmitted along the hollow radio frequency waveguide with the radio frequency signal transmitted along the planar differential pair transmission line.

Nevertheless, there is a continuous need to provide for a transition unit that allows for a highly efficient transition of the radio frequency signal, and that is easily manufactured and does not require much space.

SUMMARY OF THE INVENTION

The present disclosure relates to a radio frequency device with a transition unit providing a transition between a planar differential pair transmission line and a hollow radio frequency waveguide. The radio frequency device comprising a substrate layer arrangement with a planar differential pair transmission line arranged on one or more surfaces of at least one substrate layer of the substrate layer arrangement. The transition unit comprises an end section of the differential pair transmission line that is configured as a radio frequency signal transition pattern. The transition unit further comprises an end section of the waveguide for radio frequency electromagnetic waves that is attached to substrate layer arrangement and that superposes the radio frequency signal transition pattern. The end section of the waveguide is directed perpendicular to the first surface of the first substrate layer. An open end of the end section of the waveguide is attached to a top surface or a back surface of the substrate layer arrangement and superposes the radio frequency signal transition pattern.

The end section of the differential pair transmission line comprises a first end section of a first transmission line segment and a second end of a second transmission line segment that are arranged towards each other at a distance in a direction perpendicular to the one or more surfaces of the substrate layer arrangement. The first end section of the first transmission line segment overlaps the second end of the second transmission line segment across an overlapping section to form a capacitive coupling of the first and second end section that enhances an inductive coupling between the radio frequency electromagnetic wave within the waveguide and the end section of the differential pair transmission line. Surprisingly, the efficiency of the transition between the hollow waveguide and the planar differential pair transmission line is significantly enhanced by such a design of the end sections of the respective transmission line segments. Due to the overlap of the end sections of the transmission line segments, which are galvanically separated from each other, these end sections provide for a capacitive coupling of the two end sections, which in turn provides for a significantly enhanced inductive coupling of the radio frequency signals within the hollow waveguide and within the planar transmission line, resulting in a highly effective transition of the radio frequency signal between the hollow waveguide and the planar transmission line. No additional measures or features are required in order to provide for a highly effective transition. Thus, there is no need for e.g. vias within the surroundings of the end section of the planar transmission line in order to reduce the signal loss due to the transition.

According to an advantageous embodiment, the first and second transmission line segment each have a portion which is curved at least in sections and runs towards each other to form the overlapping first and second end section. For most applications, it is considered advantageous for the first and second transmission line segment to be arranged towards each other at a distance with respect to two directions each perpendicular to the direction of the signal transmission along the planar differential pair transmission line. Thus, due to the distance of the two transmission line segments in a direction parallel to the one or more surfaces of the substrate layer arrangement, an overlap can be formed by curved first and second end sections that extends towards each other. The direction of the first and second end section can be directed backwards, i.e. in the direction of the planar differential pair transmission line. The respective first and second end section can be ring-shaped or oval-shaped or rectangular-shaped, forming a ring-shaped or oval-shaped or rectangular-shaped capacitor line segment, whereby the end of the first and second end section is not galvanically connected to the respective first or second transmission line segment, but ends at a distance to the respective first or second transmission line segment.

In yet a preferred embodiment, the first and second end sections of the first and second transmission line segments each form an open loop, whereby both open loops overlap each other. Such an open loop significantly enhances the inductive coupling between the radio frequency electromagnetic waves that propagate along the end section of the hollow wave guides with the radio frequency signal that propagates along the planar differential pair transmission line, which in turn significantly enhances the efficiency of the signal transition between both modes of signal propagation. A cross-section of the open loops is adapted to the cross-section of the end section of the hollow waveguide in a manner as to maximize the transition efficiency. The shape of the open loops may vary according to respective needs or requirements related to the production method or to the available space.

The length of the overlapping first and second end section is predetermined in order to provide for a good transition efficiency. However, for most applications it is considered advantageous that the length of the overlapping first and second end section is less than ¼ λ, and preferably less than 1/10 λ, with λ, the wavelength of the radio frequency signal that is transmitted within the radio frequency device. It has been found that a length of the overlapping end sections being less than ¼ λ, and preferably less or equal than 1/10 λ, provides for a good efficiency and does not require much space, resulting in a small part of the cross-section of the hollow waveguide and a correspondingly small foot-print of the transition region. Furthermore, the risk of unwanted radiation escaping the transition region can be reduced.

In an advantageous embodiment, the first and second end section of the first and second transmission line segment is electroconductively connected to a bias voltage source. For many applications that allow for a tunable phase shift of the radio frequency signal that is transmitted along the planar differential pair transmission line, the first and second transmission line segments are separated from each other by a tunable dielectric material. In order to control and predetermine the dielectric properties of the tunable dielectric material, a bias voltage is required that creates an electric field within the tunable dielectric material that affects the dielectric properties of said tunable dielectric material. However, most electroconductive connections of the first and second transmission line segment affect the transmission characteristics of the planar differential pair transmission line. Reducing an unwanted effect on the transmission characteristics usually requires considerable efforts in designing and manufacturing the electroconductive connections to the first and second transmission line segments. By arranging the electroconductive connections within the respective first and second end section the adverse effects of the electroconductive connections to the transmission characteristics are significantly reduced without requiring additional efforts or constructive measures and restraints.

According to a preferred embodiment, the first and second end section of the first and second transmission line segment form a symmetric pattern with respect to the cross-section of the end section of the waveguide, and in that the electroconductive connection is positioned in a symmetry plane with respect to the cross-section of the end section of the waveguide and perpendicular to the one or more surfaces of the substrate layer arrangement. Due to the symmetry of the propagation of the electromagnetic waves within the hollow waveguide, any electroconductive modification at or near the symmetry plane will not interfere with the transition of the electromagnetic waves from or into the planar transmission line. Thus, arranging the electroconductive connection within the symmetry plane allows for e.g. the application of a bias voltage to the two transmission line segments of the planar differential pair transmission line without significantly disturbing the transition or reducing the efficiency of the transition, and without additional requirements in order to avoid any interference between the electroconductive connection and the transmission of the radio frequency signal along the planar differential pair transmission line. This allows for a very cost-effective manufacture of electroconductive connections to the planar differential pair transmission line that does not interfere with the intended signal transmission and signal transition.

According to an advantageous aspect, opposite to the end section of the waveguide, a back cavity is attached with an open end of the back cavity to the substrate layer arrangement, whereby the back cavity prevents a part of the radio frequency signal emission that is emitted from the transition pattern from leaking outside of the end section of the waveguide. By mounting the open end of the end section of the waveguide on a surface of a substrate layer of the substrate layer arrangement, the transition unit can be arranged at an arbitrary position within the surface of the substrate layer arrangement. There is no need to arrange the transition unit at a border or edge of the respective substrate layer. Thus, the disclosure allows for more options and less space restrictions related to the design of the radio frequency device. A back cavity can be easily and cost-effectively manufactured. Many radio frequency devices require complex hollow waveguide structures that can be arranged on one or both sides of the substrate layer, which facilitates the design and manufacture of additional back cavities. By adding a back cavity at the appropriate spot on the opposing surface of the substrate layer arrangement, the efficiency of the transition between the hollow waveguide and the planar differential pair transmission line can be significantly enhanced, i.e. unwanted radio frequency signal emission leaking outside of the end section of the waveguide can be reduced. Such a transition unit is considered advantageous over prior art especially with respect to radio frequency signal transitions from the planar differential pair transmission line into the adjacent hollow waveguide. Furthermore, the back cavity significantly reduces unwanted leakage of electromagnetic waves from the transition unit without the need for vias or other electroconductive elements that might provide for a shielding effect According to an advantageous embodiment, a distance between the planar differential pair transmission line and a back side of the back cavity that opposes the substrate layer is larger than at least one distance between opposing parts of the circumferential line of a cross-section of the open end of back cavity. For many applications it is considered advantageous to provide for a large distance between a back side of the back cavity and the planar differential pair transmission line, which helps to reduce the leakage of radio frequency signal emission from the transition unit. During design of the radio frequency device, there will usually be a trade-off between space requirements for the back cavity and enhancement of the signal transition efficiency.

According to a further aspect, a cross-section area of the open end of the back cavity and a cross-section area of the open end of the end section of the waveguide are identical and the open end of the back cavity superposes the open end of the end section of the waveguide. By matching the design and position of the end section of the waveguide and the back cavity, the electrical boundary conditions for the transition of the radio frequency signal can be modified and optimized in order to reduce unwanted leakage of the radio frequency signal emission from the transition unit, which will also enhance the transmission efficiency.

For many applications, it is advantageous or even mandatory to arrange several transition units onto a single substrate layer arrangement. In yet another embodiment, the radio frequency device comprises several transition units arranged adjacent to each other. The arrangement of hollow waveguides with similar signal power during use of the radio frequency device adjacent to each other imposes additional electrical boundary conditions for the radio frequency signal emission that contribute to the reduction of unwanted signal leakage from each of the transition units. In the same manner, the arrangement of back cavities adjacent to each other and opposite to the respective open ends of the corresponding end sections of the hollow waveguides also imposes additional electrical boundary conditions that reduce unwanted leakage and thus improve the efficiency for the transition of the radio frequency signal between the planar transmission line and the hollow waveguide. The arrangement of several transition units adjacent to each other as well as the design and position of each transition unit can be easily modified and adapted to the respective needs related to the radio frequency device in question as well as to the intended transition efficiency for the radio frequency signals that are transmitted within the radio frequency device.

For many applications, the diameter of a hollow waveguide will be less than a preferred distance between adjacent hollow waveguides that depends on the wavelength of the radio frequency signal and results in favorable electrical boundary conditions for reducing unwanted leakage. Thus, a preferred arrangement of adjacent transition units might require some distance between adjacent hollow waveguides and the respective transition units.

According to an aspect, the design of two or more back cavities that are arranged adjacent to each other is identical. Furthermore, it is also considered advantageous that the design of two or more end sections of the waveguides that are arranged adjacent to each other is also identical. By matching the design and position of the end sections of the waveguides or of the corresponding back cavities or of both, the electrical boundary conditions for the transition of the radio frequency signal that is transmitted through each of the transition units are advantageous and support a very efficient transition of the radio frequency signal by reducing most of the unwanted leakage of the radio frequency signal emission from the respective transition unit. The favorable electrical boundary conditions can be preset by arranging a number of identical transition units adjacent to each other along a straight line or curved row.

According to a preferred embodiment, opposite to the end section of the waveguides of the several transition units a common back cavity that extends along the several transition units is arranged next to the substrate layer with an open end of the common back cavity facing the substrate layer arrangement. Such a common back cavity allows for simple and cost-effective manufacturing. Furthermore, it has been found that a common back cavity provides for favorable electrical boundary conditions that are similar or even more benefitting than those of dedicated back cavities for each of the opposing end sections of the waveguides.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings and described in the detail description are referred to by the same reference numerals.

DETAILED DESCRIPTION OF THE INVENTION

Figure 1:
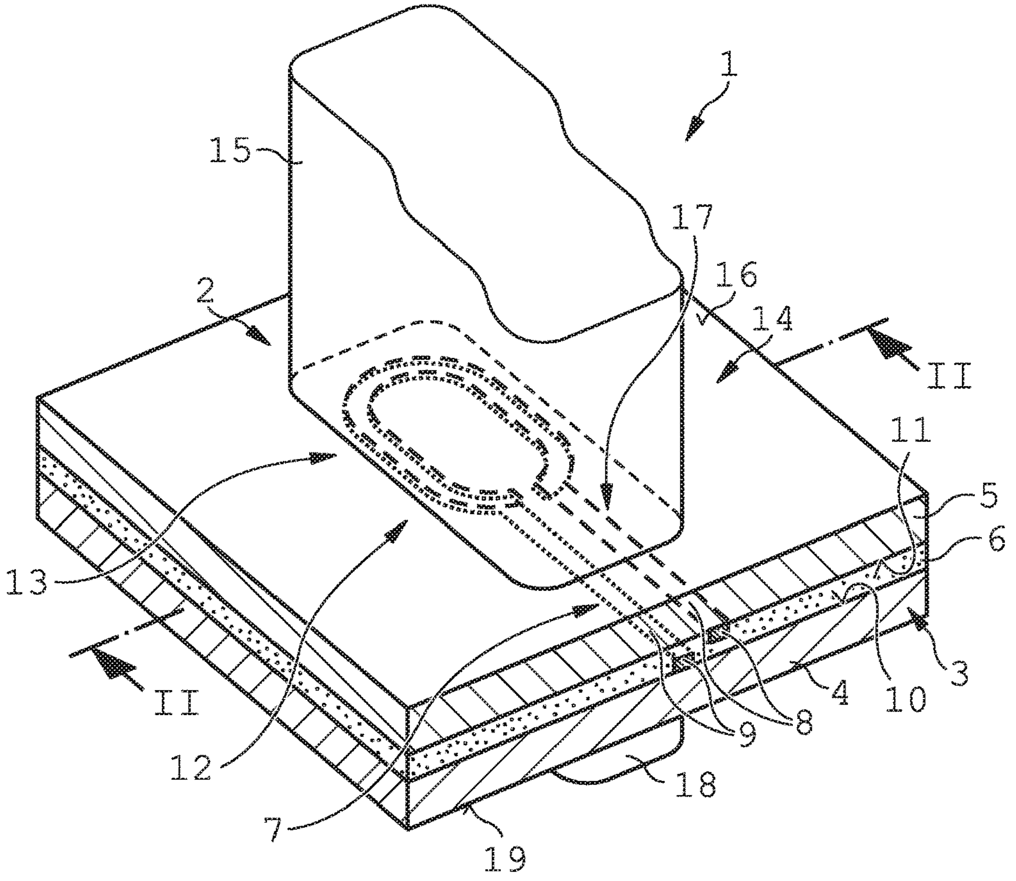
FIG. 1 illustrates a perspective view of a transition unit of a radio frequency device.
Figure 2:
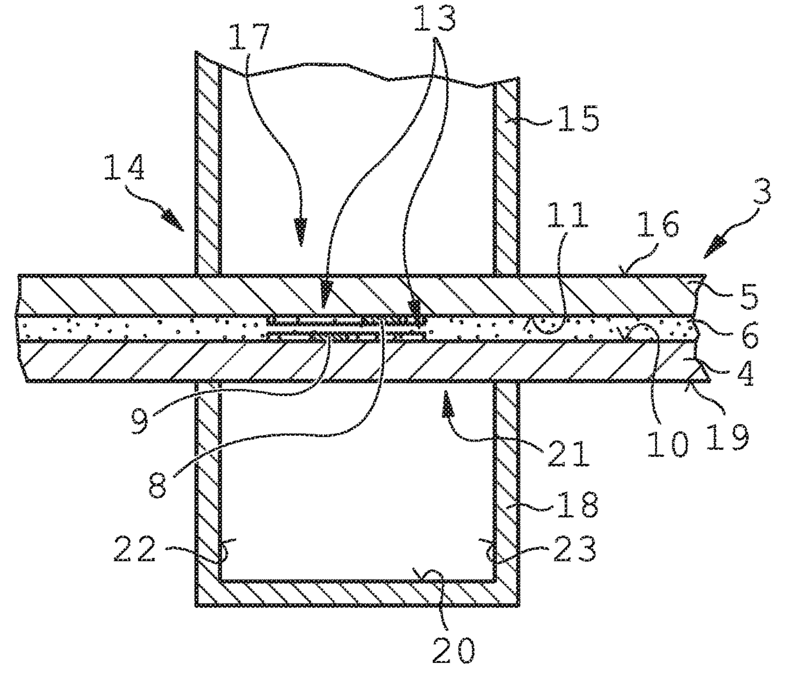
FIG. 2 illustrates a sectional view along the line II-II of the transition unit shown in FIG. 1.

In FIGS. 1 and 2, a perspective sectional view of an exemplary part of a radio frequency device 1 with a transition unit 2 according to the present invention is shown in FIG. 1. The radio frequency device 1 is with an arrangement of two substrate layers with a planar differential pair transmission line arranged between facing surfaces of the substrate layers, with an end section of a hollow waveguide positioned at a top surface of a substrate layer arrangement comprising the two substrate layers, whereby an end section of the hollow waveguide superposes the radio frequency signal transition pattern of the planar differential pair transmission line, and with a back cavity opposingly attached to a back surface of the substrate layer arrangement. The radio frequency device 1 comprises a substrate layer arrangement 3 that comprises a first substrate layer 4 and a second substrate layer 5, each made of an electrically non-conducting material, e.g. glass. The first and second substrate layer 4, 5 are arranged parallel and at a distance towards each other. The volume between the first and second substrate layer 4, 5 is filled with a tunable dielectric material 6, e.g. a liquid crystal material with variable and controllable dielectric properties. The volume between the first and second substrate layer 4, 5 can be segmented to allow for many small segments or chambers that are filled with the tunable dielectric material 6. The dielectric properties of the tunable dielectric material 6 can be controlled e.g. by applying a bias voltage to bias electrodes on opposite sides of the volume or of a small segment for which the dielectric properties of the tunable dielectric material are to be preset or modified.

A planar differential pair transmission line 7 with two parallel transmission line segments 8, 9 of an electrically conducting material is arranged on a first surface 10 of the first substrate layer 4 and on a second surface 11 of the second surface layer 5 of the substrate layer arrangement 3. The first surface 10 and the second surface 11 are facing each other and confine the volume between the first and second substrate layer 4, 5. The planar differential pair transmission line 7 in FIG. 1 extends into an end section 12 in FIG. 1 that is configured as a radio frequency signal transition pattern 13. The transition pattern 13 as viewed from a top view perpendicular to the first and second surface 10, 11 of the substrate layer arrangement 3 forms an open loop structure that is oval shaped within this embodiment. In FIG. 1 the first transmission line segment 8 is represented by a dashed line and the second transmission line segment 9 is represented by a dotted line. Both transmission line segments 8, 9 run parallel and with a distance towards each other into the end section 12 forming an overlapping transition pattern. A small deviation parallel to the first and second surface 10, 11 is shown for clarification only, as both transmission line segments 8, 9 exactly overlap within the end section 12.

An end section 14 of a hollow waveguide 15 made from an electroconductive material is also arranged on a first outer surface 16 of the substrate layer arrangement 3. An open end 17 of the end section 14 of the hollow waveguide 15 superposes the radio frequency signal transition pattern 13 of the end section 12 of the planar differential pair transmission line 7, as can be seen in FIG. 2. Thus, a radio frequency signal that is transmitted along the planar differential pair transmission line 7 towards the end section 12 will be emitted from the frequency signal transition pattern 13. A part of the emitted signal power will be directed through the open end 17 and into the hollow waveguide 15. Another part of the emitted signal power will be directed into an opposite direction.

Opposite to the end section 14 of the hollow waveguide 15 there is a back cavity 18 as shown in FIG. 2 that is mounted onto a second outer surface 19 of the substrate layer arrangement 3, whereby the second outer surface 19 is opposite to the first outer surface 16 of the substrate layer arrangement 3. A distance between the second outer surface 19 of the substrate layer arrangement 3 and a back side 20 of the back cavity 18 that opposes the second outer surface 19 is larger than the distance between opposing parts of the circumferential line of a cross-section of an open end 21 of the back cavity 18, i.e. larger than a distance between opposing wall sections 22, 23 around the open end 21 of the back cavity 18.

A shape of the open end 21 of the back cavity 18 equals the shape of the open end 17 of the hollow waveguide 15. Furthermore, the open end 21 of the back cavity 18 is positioned opposing to the end section 14 of the hollow waveguide 15 in a manner as to fully superimpose the open end 17 of the hollow waveguide 15. A large part of the signal power that is directed into the direction of the back cavity 18 will be reflected and fed into the hollow waveguide 15. By adding the back cavity 18 to the transition unit 2, an unwanted leakage of radio frequency signal emission from the transition unit 2 can be significantly reduced.

Figure 3:
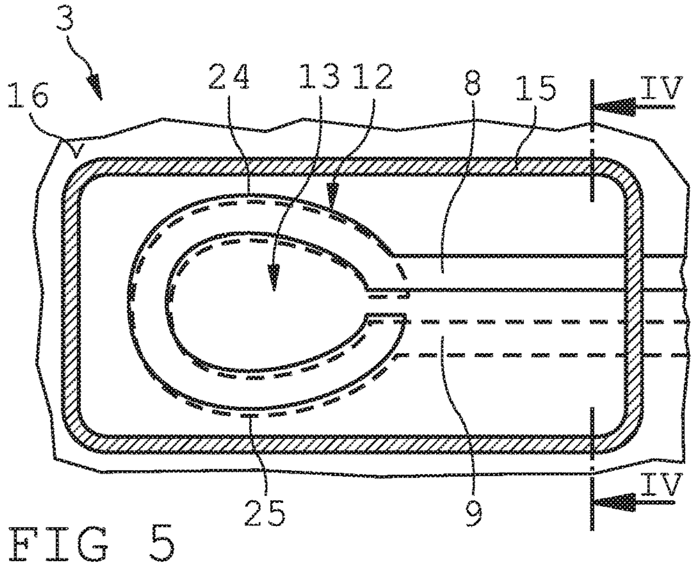
FIG. 3 illustrates a top view of an embodiment of the transition unit, whereby the end section of the respective differential pair transmission line is configured as an oval radio frequency signal transition pattern.
Figure 4:
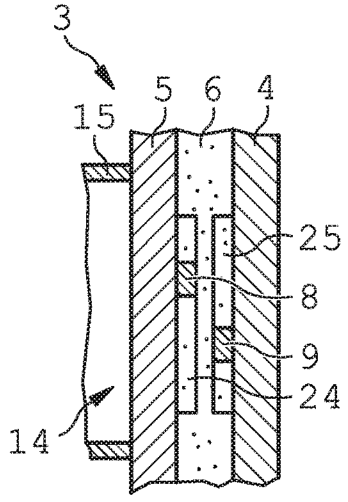
FIG. 4 illustrates a sectional view along the line IV-IV shown in FIG. 3.

FIGS. 3 to 8 show a part of a top view and a respective sectional view of three different embodiments of a transition unit 2 of the radio frequency device 1 that is designed according to the invention. FIGS. 3 and 4 illustrate an end section 12 as shown in FIG. 3 of the planar differential pair transmission line 7 that forms an oval-shaped open loop transition pattern 13 as shown in FIG. 3. A first end section 24 of the first transmission line segment 8 is shown with solid lines, whereas a second end section 25 of the second transmission line segment 9 is shown with dashed lines. A small deviation in a direction parallel to the first outer surface 16 as shown in FIG. 3 is only for clarification purposes, as both first and second end section 24 and 25 exactly overlap each other within the transition pattern 13.

Figure 5:
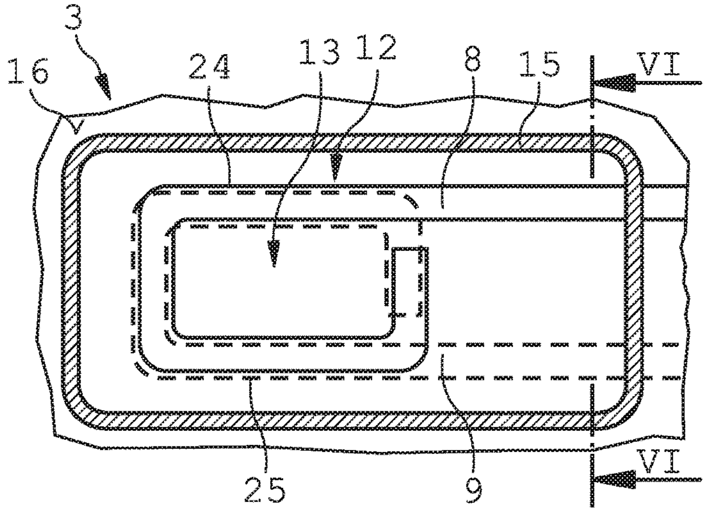
FIG. 5 illustrates a top view of another embodiment of the transition unit, whereby the end section of the respective differential pair transmission line is configured as a rectangular radio frequency signal transition pattern.
Figure 6:
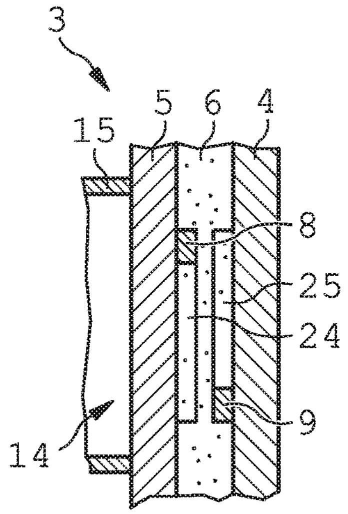
FIG. 6 illustrates a sectional view along the line VI-VI shown in FIG. 5.

FIGS. 5 and 6 illustrate another embodiment of the transition unit 2 as shown in FIG. 1 of a radio frequency device 1 as shown in FIG. 1. The first and second end section 24, 25 of the respective first and second transmission line segment 8, 9 form a rectangular shaped open loop transition pattern 13 as shown in FIG. 5. The distance between the first and second transmission line segment 8, 9 is larger than with the embodiment that is illustrated in FIGS. 3 and 4. However, it is also possible to arrange both the first and second transmission line segment 8, 9 in such a manner that the first and second transmission line segments run with a smaller distances towards each other into the end section 12 as shown in FIG. 5 of the planar differential pair transmission line 7 as shown in FIG. 1 and the transition pattern 13 that is formed by the overlapping first and second end sections 24, 25.

Figure 7:
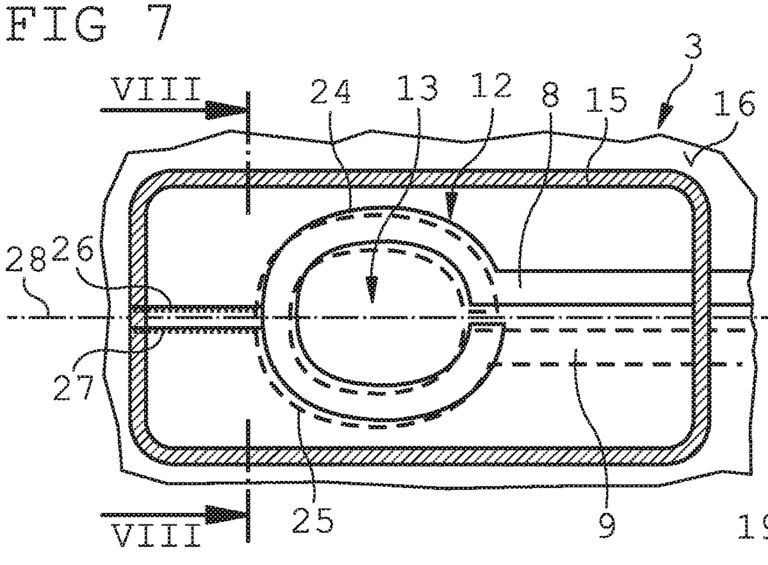
FIG. 7 illustrates a top view of yet another embodiment of the transition unit, whereby the end section of the respective differential pair transmission line is configured as a circular radio frequency signal transition pattern.
Figure 8:
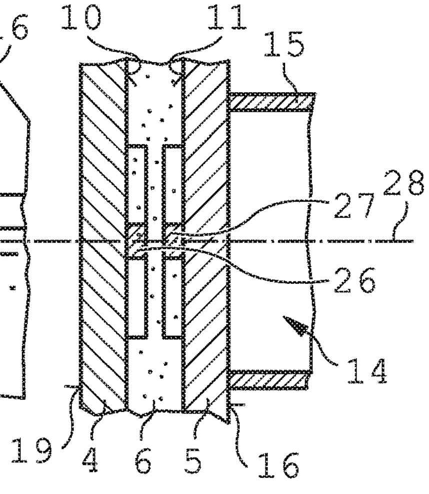
FIG. 8 illustrates a sectional view along the line VIII-VIII shown in FIG. 7.
Figure 11:
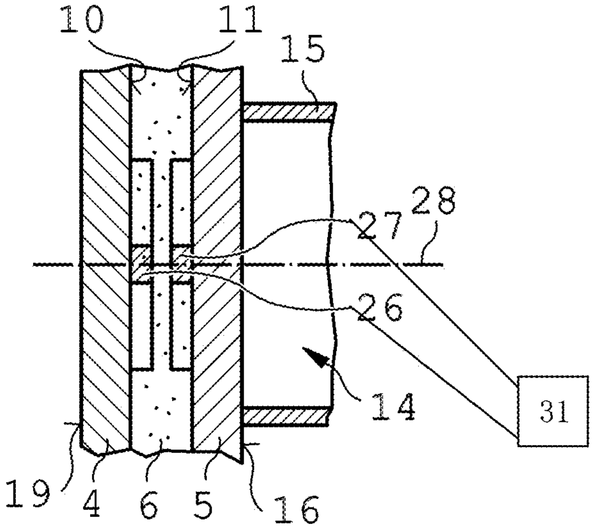
FIG. 11 illustrates a top view of yet another embodiment of the transition unit.

FIGS. 7 and 8 illustrate yet another embodiment of the transition unit 2 as shown in FIG. 1 with first and second end sections 24, 25 that form a circular shaped open loop transition pattern 13 as shown in FIG. 7. Each of the first and second end section 24, 25 is electroconductively connected by an electroconductive line segment 26, 27 to a bias voltage source 31 that is not shown in FIGS. 7 and 8 and is shown in FIG. 11. The electroconductive line segments 26, 27 are arranged along a symmetry plane 28 with respect to the cross-section of the end section 14 as shown in FIG. 8 of the waveguide 15 and perpendicular to the one or more surfaces 10, 11, 19 (as shown in FIG. 8) 16, of the substrate layer arrangement 3. The open loop transition pattern 13 formed by the first and second end sections 24, 25 is also designed and arranged to be symmetric with respect to the symmetry plane 28.

Figure 9:
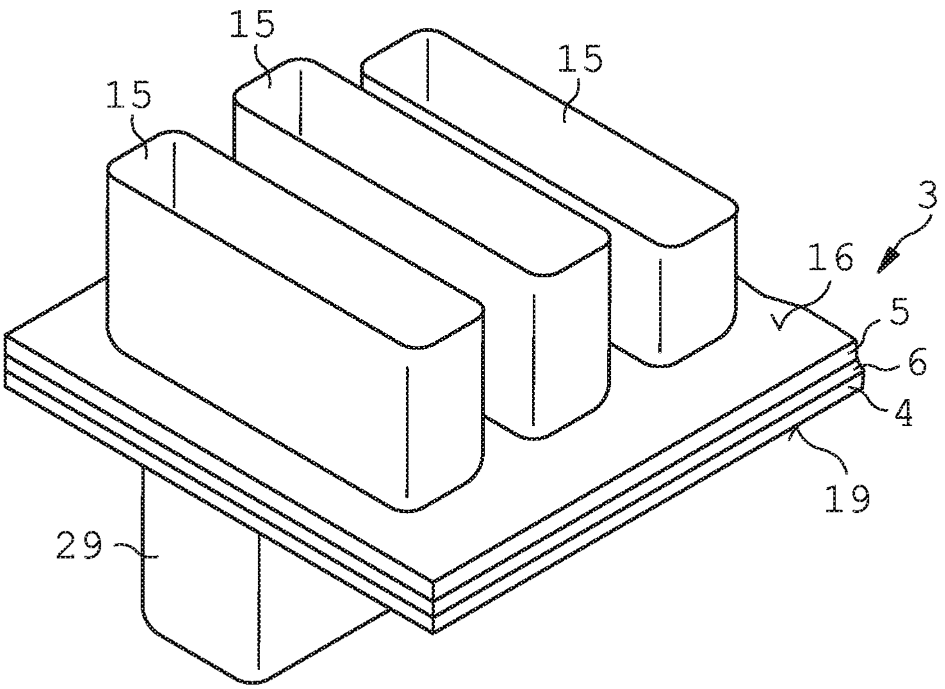
FIG. 9 illustrates a perspective view of another embodiment of a radio frequency device with several transition units, whereby several hollow waveguides are arranged along a row and a common back cavity is arranged on the opposing side of the substrate layer arrangement.
Figure 10:
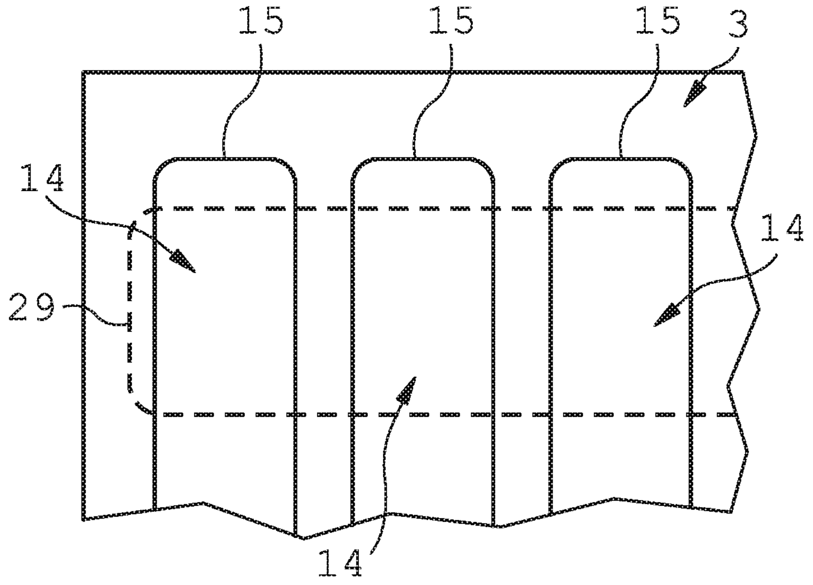
FIG. 10 illustrates a schematic top view of the embodiment shown in FIG. 9.

FIGS. 9 and 10 illustrate yet another aspect of the radio frequency device 1 as shown in FIG. 1 with several transition units 2 arranged along a straight line. Three hollow waveguides 15 are shown that represent a row of transition units 2 as shown in FIG. 1 which might comprise more than three hollow waveguides 15. At an opposite side of the substrate layer arrangement 3 there is a common back cavity 29 that partially overlaps with the end sections 14 as shown in FIG. 10 of the hollow waveguides 15, but extends over many or all end sections 14 of the hollow waveguides 15 that are aligned along the row. An open end of the common back cavity 29 faces the substrate layer arrangement 3 and thus the several hollow waveguides 15 arranged at an opposite side of the substrate layer arrangement 3. Most part of a radio frequency signal emission that is emitted by the frequency signal transition pattern 13' as shown in FIG. 1 of the planar differential pair transmission line 7 as shown in FIG. 1 will be directed either into the first hollow waveguide 15 that is arranged on the first outer surface 16 as shown in FIG. 9 of the substrate layer arrangement 3 or into the common hollow waveguide 29 that is arranged on the second outer surface 19 of the substrate layer arrangement 3 opposing the first hollow waveguide 15. The undesired leakage of radio frequency signal emission from the transition unit 2 will be significantly reduced.

What is claimed is:

1. A radio frequency device (1), comprising:

a substrate layer arrangement (3) with a planar differential pair transmission line (7) arranged on one or more surfaces (10, 11) of at least one substrate layer (4, 5) of the substrate layer arrangement (3); and a transition unit (2) providing a transition between the planar differential pair transmission line (7) and a hollow radio frequency waveguide (15), comprising an end section (12) of the planar differential pair transmission line (7) that is configured as a radio frequency signal transition pattern (13), an end section (14) of the waveguide (15) for radio frequency electromagnetic waves that is attached to the substrate layer arrangement (3) and that superposes the radio frequency signal transition pattern (13), wherein the end section (14) of the waveguide (15) is directed perpendicular to the one or more surfaces (10, 11) of the substrate layer arrangement (3) with the planar differential pair transmission line (7), wherein an open end (17) of the end section (14) of the waveguide (15) is attached to a first outer surface (16) or a second outer surface (19) of the substrate layer arrangement (3), wherein the end section (12) of the planar differential pair transmission line (7) comprises a first end section (24) of a first transmission line segment (8) and a second end section (25) of a second transmission line segment (9) are arranged towards each other at a distance in a direction perpendicular to the one or more surfaces (10, 11) of the substrate layer arrangement (3), and wherein the first end section (24) of the first transmission line segment (8) overlaps the second end section (25) of the second transmission line segment (9) across an overlapping section to form a capacitive coupling of the first and second end section (24, 25) that enhances an inductive coupling between the radio frequency electromagnetic wave within the waveguide (15) and the end section (12) of the planar differential pair transmission line (7), wherein the first and second end sections (24, 25) of the first and second transmission line segments (8, 9) each form an open loop, wherein both the open loops of the first and second transmission line segments overlap each other to form the transition pattern (13).

2. The radio frequency device (1) according to claim 1, wherein the radio frequency device (1) comprises several transition units (2) arranged adjacent to each other.

3. The radio frequency device (1) according to claim 2, wherein opposite to the end section (14) of the waveguides (15) of the several transition units (2) a common back cavity (29) that extends along the several transition units (2) is arranged next to the substrate layer arrangement (3) with an open end (30) of the common back cavity (29) facing the substrate layer arrangement (3).

4. The radio frequency device (1) according to claim 1, wherein a length of the overlapping first and second end sections (24, 25) is less than ¼λ with λ being the wavelength of a radio frequency signal that is transmitted within the radio frequency device (1).

5. The radio frequency device (1) according to claim 1, wherein a length of the overlapping first and second end sections (24, 25) is less than ⅒λ with λ being the wavelength of a radio frequency signal that is transmitted within the radio frequency device (1).

6. The radio frequency device (1) according to claim 1, wherein the first and second end sections (24, 25) of the first and second transmission line segments (8, 9) is electroconductively connected to a bias voltage source.

7. The radio frequency device (1) according to claim 6, wherein the first and second end sections (24, 25) of the first and second transmission line segment (8, 9) form a symmetric pattern with respect to a cross-section of the end section (14) of the waveguide (15), and wherein an electroconductive connection is positioned in a symmetry plane (28) with respect to the cross-section of the end section (14) of the waveguide (15) and perpendicular to the one or more surfaces (10, 11) of the substrate layer arrangement (3).

8. The radio frequency device (1) according to claim 1, wherein opposite to the end section (14) of the waveguide (15), a back cavity (18) is attached with an open end (21) of the back cavity (18) to the substrate layer arrangement (3), wherein the back cavity (18) prevents a part of a radio frequency signal emission that is emitted from the transition pattern (13) from leaking outside of the end section (14) of the waveguide (15).

9. The radio frequency device (1) according to claim 1, wherein the first and second transmission line segment (8, 9) each having a portion which is curved at least in sections and arranged with respect to each other to form the overlapping first and second end section (24, 25).

* * * * *